United States Patent [19]

Plaza

[11] 4,206,859

[45] Jun. 10, 1980

[54] EASY-LOAD RECORD MATERIAL FEED APPARATUS

[75] Inventor: Mario G. Plaza, Fremont, Calif.

[73] Assignee: Xerox Corporation, Stamford, Conn.

[21] Appl. No.: 960,990

[22] Filed: Nov. 15, 1978

[51] Int. Cl.[2] .................. G03B 1/30

[52] U.S. Cl. .................. 226/74; 226/170

[58] Field of Search .................. 226/170, 74, 75, 76, 226/78, 81, 172

[56] References Cited

U.S. PATENT DOCUMENTS

| | | | |
|---|---|---|---|
| 2,171,003 | 8/1939 | Mabon | 226/74 X |
| 3,929,267 | 12/1975 | Foster | 226/74 |
| 3,938,721 | 2/1976 | Stoneck | 226/75 |

*Primary Examiner*—Edward J. McCarthy
*Attorney, Agent, or Firm*—Barry Paul Smith

[57] ABSTRACT

Apparatus for feeding marginally punched record material comprises a main support member, and a plurality of drive pins mounted to the main support member for movement along a predefined path past a first location at which record material is inserted into the apparatus. Means included on the main support member adjacent the first location facilitates the buckling of record material inserted into the apparatus in a direction away from the pins during movement of the pins along the predefined path when there is no initial engagement of a pin with a marginal opening of the record material. When a pin thereafter moves into substantial registration with a marginal opening of the record material, the natural bias of the buckled portion of the record material in the direction of the pins will return it to a substantially unbuckled state to thereby engage the pin with the opening.

6 Claims, 5 Drawing Figures

EASY-LOAD RECORD MATERIAL FEED APPARATUS

BACKGROUND OF THE INVENTION

This invention relates to apparatus capable of feeding marginally punched record material and, more particularly, to such an apparatus for use with a printing machine of the type comprising a platen and drive means for rotating the platen about its longitudinal axis.

When feeding marginally punched record material, such as computer forms paper, it is generally necessary to use a feeding apparatus different than the conventional platen-pressure roller arrangement, due to the thickness of the multi-copy paper and the use of periodic perforations for tearing purposes. The two most common feeding apparatus for this type of record material are the pin-feed apparatus and the tractor feed apparatus. An exemplary pin feed apparatus is disclosed in U.S. Pat. No. 4,033,493, whereas an exemplary tractor feed apparatus is disclosed in U.S. Pat. No. 4,042,091. In both the pin feed apparatus and the tractor feed apparatus, the platen pressure rollers must necessarily be disengaged during feeding by such apparatus. U.S. Pat. No. 4,042,091 discloses a novel manner by which this may be done automatically through movement of a guide rack included in the feed apparatus.

Very recently, it has become necessary to provide a record material feed apparatus with a bi-directional feeding capability. This is especially true when computer forms paper is used to print graphical data and the like. A pin feed apparatus having a bi-directional feeding capability is disclosed in U.S. Pat. No. 4,033,493. One problem with pin feed apparatus, however, is that the pin wheels are usually mounted on the platen drive shaft at the opposing end of the platen. Thus, the size of the record material is normally restricted to a width substantially coincident with the length of the platen.

Tractor feed apparatus of the type disclosed in U.S. Pat. No. 4,042,091 avoid the above problem through the use of a pair of tractor feed assemblies slidably mounted on a pair of shafts adjacent to the platen. The slidability of these assemblies insures that virtually any sized record material up to the length of the platen itself can be employed. Tractor feed apparatus traditionally employ tractor feed assemblies of the above type each of which includes a continuous belt driven by pins projecting from the belt surface. The belt is driven by a single sprocket wheel mounted to one of the shafts to which the tractor feed assembly is slidably mounted.

In prior art bi-directional tractor feed apparatus using such tractor feed assemblies, one flat belt side is used to pull record material through the printer in one direction, and the other side of the same belt is used to pull it in the reverse direction. Loading of the record material in such apparatus is generally awkward and often results in damage to the marginally punched holes on the record material. It also usually requires either blind loading of the paper or requires that the apparatus be swivelable forwards to expose the reverse feeding side of the belt for loading. Additionally, sometimes the record material falls off the rear side of the tractor assemblies, if not properly supported, during operation.

It would be desirable, therefore, to provide a record material feed apparatus, particularly one adapted for bi-directional feeding, that is easier to load with record material than current conventional record material feed apparatus.

SUMMARY OF THE INVENTION

In accordance with the invention, apparatus is provided for feeding marginally punched record material, such apparatus comprising a main support member; a plurality of drive pins mounted to said main support member for movement along a predefined path past a first location at which record material is inserted into said apparatus; and means included on said main support member adjacent said first location for facilitating the buckling of record material that is inserted into said apparatus in a direction away from said pins during movement of said pins along said predefined path when there is no initial engagement of a pin with a marginal opening of said record material, whereby when a pin thereafter moves into substantial registration with a marginal opening of said record material, the natural bias of the buckled portion of said record material in the direction of said pins will return it to a substantially unbuckled state to thereby engage said pin with said opening.

In accordance with the preferred embodiment, the means for facilitating buckling of the record material includes a notch formed in a bottom cover of the main support member. The notch has a first angled portion that directs the record material away from the pins, thereby causing the material to buckle adjacent the leading edge thereof. Afer initial registration is made between a pin and a hole in the record material, thereby enabling the record material to snap back into a substantially unbuckled state, a second angled portion of the notch insures that the leading edge of the record material will be directed back into the desired feed path through the feed apparatus.

These and other aspects and advantages of the invention will be described below with reference to the accompanying drawings.

DESCRIPTION OF THE PREFERRED EMBODIMENT

Figure 1:
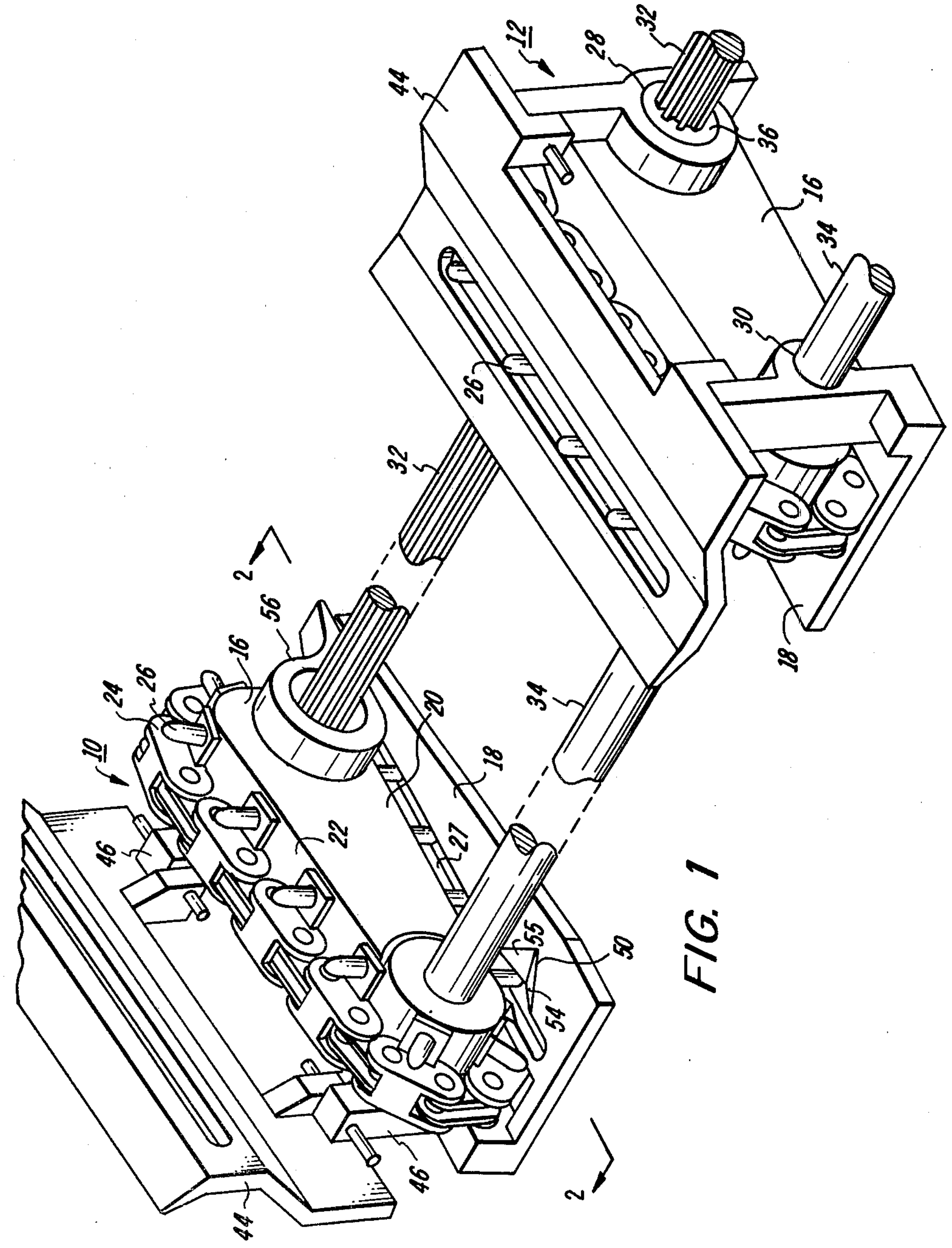
FIG. 1 is a front perspective view of a pair of record material feed apparati of the invention mounted to a support frame for attachment to a printer.
Figure 4:
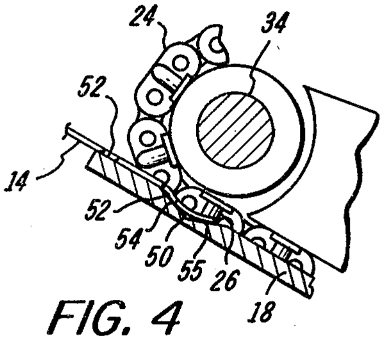
FIG. 4 is the same view as FIG. 3, showing the leading edge of the record material inserted into the record material feed apparatus and buckled due to the action of the pins and notch of such apparatus.
Figure 5:
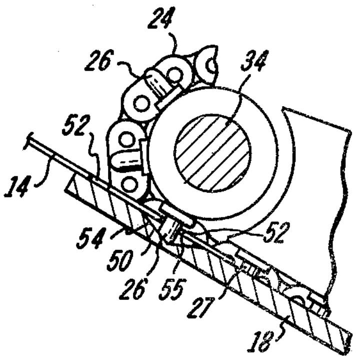
FIG. 5 is the same view as FIGS. 3 and 4 showing the leading edge of the record material unbuckled with a pin engaged with a marginal hole in the record material.

Referring to FIG. 1, a pair of feeding apparati 10 and 12 are shown for feeding marginally punched record material 14 (FIGS. 3–5), such as computer forms paper or the like. The feeding apparati 10 and 12 are desirably each of the tractor feeder type, and shall hereinafter be referred to as tractor feeders 10 and 12. The tractor feeders 10 and 12 are identical in all respects, except they are basically "mirror-images" of one another, as shown in FIG. 1.

Each tractor feeder 10 and 12 includes a main support member or frame 16 having a bottom floor 18. A central upstanding portion 20 of the frame 16 has an outer peripheral surface 22 defining a closed-loop path of movement of a conventional chain-link drive belt 24 containing a plurality of spaced drive pins 26. The space 27 between the bottom floor 18 and the opposing portion of peripheral surface 22 is sufficient to enable record material 14 of a desired thickness to be driven therebetween by the pins 26 in a manner to be described below.

As is conventional, the upstanding central portion 20 of the frame 16 has a pair of spaced openings 28 and 30 for accommodating a pair of support shafts 32 and 34 for rotation relative to the upstanding central portion 20. As is also conventional, one of the openings, such as opening 28, has a sprocket drive gear 36 disposed therein for relative rotation. The gear has teeth (not shown) that project outwardly of the peripheral surface 22 through a suitable opening therein (not shown) in order to engage sequentially the spaces between the chains of the drive belt 24, as is further conventional. The drive gear 36 has spaced grooves 38 formed on its inner surface for engagement with corresponding spaced ridges 40 formed in the surface of the support shaft 32, which then also serves as a drive shaft.

Figure 2:
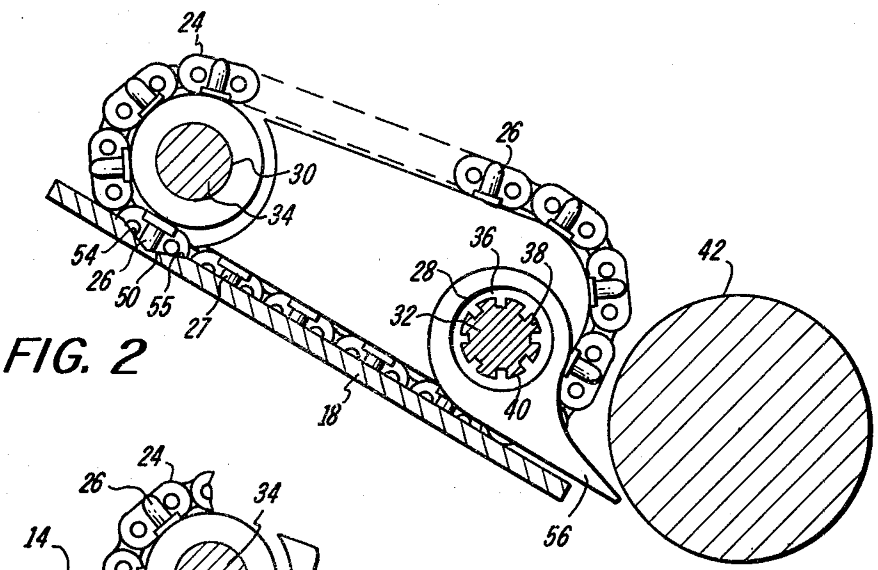
FIG. 2 is a partial cross-sectional view of one of the record material feed apparati of FIG. 1 showing its relationship to an adjacent platen.

The shafts 32 and 34 preferably form part of an overall tractor feeder support assembly (not shown) that includes means for driving the shaft 32 and means for attaching the assembly to an impact printer of the type including a platen 42 (FIG. 2). An exemplary tractor feeder support assembly that could be used for this purpose is disclosed in U.S. Pat. No. 4,042,091.

Each tractor feeder 10 and 12 includes a top cover in the form of a door 44 hinged to a pair of support bars 46 upstanding from the central portion 20 of the frame 16. The door 44 of the tractor feeder 10 is hinged at its left side for opening counterclockwise, and the door 44 of the tractor feeder 12 is hinged at right side for opening clockwise. The doors 44 are opened during loading of record material 14 onto the pins exposed above the upper portion of the peripheral surface 22.

As shown in FIG. 2, the movement of the drive belts 24 and the drive pins 26 of the tractor feeders 10 and 12 is such that the record material 14 may be loaded into each tractor feeder in the space 27 between the bottom floor 18 thereof and the lower portion of the peripheral surface 22 at a location adjacent the rear end of the frame 16 (the left end as shown in FIG. 2). Once loaded, the record material 14 will be directed by the pins 26 of each tractor feeder 10 and 12 through the space 27 and then out the front end of the frame 16 (the right end as shown in FIG. 2). The record material 14 may then be directed to suitable means (not shown) around the printer platen 42 and then back toward the tractor feeders 10 and 12. The shaft 32 may then be stopped and the doors 44 opened so that the record material may be loaded onto the upwardly exposed pins 26. The doors 44 may then be closed and the drive shaft 32 restarted. In this manner, the pins 26 exposed in the space 27 beneath the peripheral surface 22 will direct the record material in a forward direction through the space 27, whereas the pins 26 exposed above the peripheral surface 22 will direct the record material in a rearward direction through the space between the door 44 and the upper portion of the peripheral surface 22. The tractor feeders 10 and 12 are thereby operable as bidirectional tractor feed assemblies.

Figure 3:
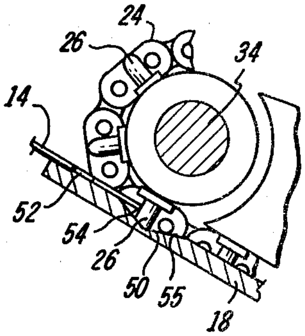
FIG. 3 is a magnified view of a portion of the record material feed apparatus of FIG. 2, showing a record material to be inserted into the apparatus.

Referring now to FIGS. 1, 2 and 3, a notch 50 is formed on the upper surface of the bottom floor 18 of each tractor feeder 10 and 12. In the case of left tractor feeder 10, the notch 50 is formed to the right of the path of pins 26 and adjacent the rear end (left end in FIG. 2) of the bottom floor 18 thereof. In the case of right tractor feeder 12, the notch 50 is formed to the left of the path of pins 26 and adjacent the rear end of the bottom floor 18 thereof.

The purpose of the notches 50 in the tractor feeders 10 and 12 is to deliberately facilitate buckling the leading edge of the record material 14 upon insertion thereof in the space 27 between the bottom floor 18 and the peripheral surface 22, when there is no immediate registration of a pin 26 with a marginal hole 52 (FIG. 3) in the record material 14. To this end, the notches 50 each include a first angled portion 54, preferably about 45° relative to a line normal to the upper surface of the bottom floor 18. This first angled portion 54 directs the leading edge of record material 14 into the depth of the notch 50 when no immediate registration occurs (see FIG. 4), thereby deliberately buckling the record material 14 adjacent its leading edge.

As the pins 26 progress around their predefined path during movement of the belts 24, the record material 14 will be moved relative to the bottom floor 18 due to the force of the pins 26 on the record material. However, the pins 26 will also move relative to the record material due to slippage. Eventually, a pin 26 of each tractor feeder 10 and 12 will move into substantial registration with a marginal hole 52. The normal bias of the buckled portions of record material 14 will then cause same to spring back to a substantially unbuckled condition and thereby fully engage the aligned pins 26 and openings 52 (see FIG. 5). The record material 14 is then fully loaded on the lower projecting pins 26 and is ready for continued forward movement through the sapce 27 between the bottom floor 18 and the peripheral surface 22.

To insure the return of the leading edge of the record material 14 to a substantially parallel path of progression through the space 27 in each tractor feeder 10 and 12, following unbuckling of the record material, each notch 50 includes a second angled portion 55 located forwardly of the first angled portion 54. The second angled portion 55 is preferably of a more gradual slope, e.g., about 75° to a line perpendicular to the bottom floor 18. The purpose of the second angled portion 55 is to "ease" the leading edge of the record material 14 back into the desired parallel path of travel to the extent such is not effected during unbuckling.

So as to insure that record material 14 exiting the front end of the tractor feeders 10 and 12 from the spaces 27 does not remain engaged with the pins 26 and be directed around such front ends instead of being advanced directly toward the platen 42, each tractor feeder 10 and 12 includes a finger 56 forming part of the central portion 20. Each finger 56 essentially extends the linear space 27 for travel of the record material to a point well past the location at which the pins 26 turn upwardly along their path, as best shown in FIG. 2.

Although the invention has been described with respect to a presently preferred embodiment, it will be appreciated by those skilled in the art the various modifications, substitutions, etc. may be made without departing from the spirit and scope of the invention as defined in and by the following claims.

What is claimed is:

1. Apparatus for feeding marginally punched record material, comprising:

a main support member;

a plurality of drive pins mounted to said main support member for movement along a predefined path past a first location at which record material is inserted into said apparatus; and means included on said main support member adjacent said first location for facilitating the buckling of record material that is inserted into said apparatus in a direction away from said pins during movement of said pins along said path when there is no initial engagement of a pin with a marginal opening of said record material, whereby when a pin thereafter moves into substantial registration with a marginal opening of said record material, the natural bias of the buckled portion of said record material in the direction of said pins will return it to a substantially unbuckled state to thereby engage said pin with said opening.

2. The apparatus of claim 1, wherein said main support member includes a bottom floor, and said means for facilitating includes a notch formed on said bottom floor adjacent said first location.

3. The apparatus of claim 2, wherein said notch includes a first angled portion for directing the leading edge of record material into the depth of said notch when no immediate registration occurs between a pin and a marginal opening of said record material.

4. The apparatus of claim 3, wherein said notch includes a second angled portion located forwardly of said first angled portion for directing the leading edge of record material into a desired path of progression through said apparatus.

5. The apparatus of claim 3, wherein said first angled portion is about 45° relative to a line normal to the upper surface of said bottom floor.

6. The apparatus of claim 4, wherein said first angled portion is about 45° relative to a line normal to the upper surface of said bottom floor, and said second angled portion is about 75° relative to said line.

* * * * *